(12) United States Patent
Van Oldenborgh

(10) Patent No.: US 11,461,577 B2
(45) Date of Patent: Oct. 4, 2022

(54) METHOD FOR PROTECTING THE INTELLECTUAL PROPERTY RIGHTS OF A TRAINED MACHINE LEARNING NETWORK MODEL USING DIGITAL WATERMARKING BY ADDING, ON PURPOSE, AN ANOMALY TO THE TRAINING DATA

(71) Applicant: Marc Jean Baptist Van Oldenborgh, Amsterdam (NL)

(72) Inventor: Marc Jean Baptist Van Oldenborgh, Amsterdam (NL)

( * ) Notice: Subject to any disclaimer, the term of this patent is extended or adjusted under 35 U.S.C. 154(b) by 237 days.

(21) Appl. No.: 16/627,994

(22) PCT Filed: Feb. 1, 2019

(86) PCT No.: PCT/NL2019/050066
§ 371 (c)(1),
(2) Date: Dec. 31, 2019

(87) PCT Pub. No.: WO2019/156554
PCT Pub. Date: Aug. 15, 2019

(65) Prior Publication Data
US 2020/0380145 A1    Dec. 3, 2020

(30) Foreign Application Priority Data
Feb. 12, 2018 (NL) ..................... 2020424

(51) Int. Cl.
*G06F 21/62* (2013.01)
*G06K 9/62* (2022.01)
*G06N 20/00* (2019.01)
*G06N 3/08* (2006.01)
*G06V 10/70* (2022.01)

(52) U.S. Cl.
CPC ........... *G06K 9/62* (2013.01); *G06F 21/6209* (2013.01); *G06K 9/6215* (2013.01); *G06N 3/08* (2013.01); *G06N 20/00* (2019.01); *G06V 10/70* (2022.01)

(58) Field of Classification Search
CPC .......... G06N 3/08; G06K 9/6215; G06K 9/62; G06F 21/6209; G06V 10/70
See application file for complete search history.

(56) References Cited

FOREIGN PATENT DOCUMENTS

| WO | 2015/017796 A2 | 2/2015 |
| WO | 2016/043734 A1 | 3/2016 |

OTHER PUBLICATIONS

Gu et al., "BadNets: Identifying Vulnerabilities in the Machine Learning Model Supply Chain," Aug. 22, 2017, ARXIV.org, Cornell University Library [https://arxiv.org/pdf/1708.06733.pdf], 13 pages.
Quiring et al., "Fraternal Twins: Unifying Attacks on Machine Learning and Digital Watermarking," Mar. 16, 2017, ARXIV.org, Cornell University Library [https://arxiv.org/abs/1703.05561], 17 pages.

(Continued)

*Primary Examiner* — Abbas I Abdulselam
(74) *Attorney, Agent, or Firm* — Seed IP Law Group LLP

(57) ABSTRACT

The invention provides a method for marking a machine learning model, said method comprising providing a training dataset, adding at least one anomaly to said training dataset, and training said machine learning model using said training dataset. This can for instance help to protect property rights on trained neural networks.

18 Claims, 2 Drawing Sheets

(56) References Cited

OTHER PUBLICATIONS

Crowe, "The Map Room", (http://archives.maproomblog.com/2005/11/copyright_traps.php), 2 pages.
Maxwell, "Map Traps: Intentional Mapping Errors to Combat Plagiarism", (https://gislounge.com/map-traps-intentional-mapping-errors-combat-plagiarism/), 3 pages.
Esmaeili et al., "A Robust and Fast Video Copy Detection System Using Content-Based Fingerprinting", Dec. 2010, (http://ieeexplore.ieee.org/document/5672596/), 14 pages.
Oostveen et al., "Feature Extraction and a Database Strategy for Video Fingerprinting", Apr. 2002, (https://link.springer.com/chapter/10.1007/3-540-45925-1_11), 12 pages.
Sheppard et al., "Digital watermarks for copyright protection", Journal of Law and Information Science, 2002, (http://ro.uow.edu.au/cgi/viewcontent.cgi?article=9495&context=infopapers), 23 pages.
Uchida et al., "Embedding Watermarks into Deep Neural Networks", Apr. 2017, (https://arxiv.org/abs/1701.04082), 10 pages.
Szegedy et al., "Intriguing properties of neural networks", Feb. 2014, (https://arxiv.org/abs/1312.6199), 10 pages.
Le Merrer et al., "Adversarial frontier stitching for remote neural network watermarking", Nov. 2017, (https://arxiv.org/abs/1711.01894), 12 pages.

METHOD FOR PROTECTING THE INTELLECTUAL PROPERTY RIGHTS OF A TRAINED MACHINE LEARNING NETWORK MODEL USING DIGITAL WATERMARKING BY ADDING, ON PURPOSE, AN ANOMALY TO THE TRAINING DATA

FIELD OF THE INVENTION

The invention relates to a method for marking a machine learning model, a data carrier and a device.

BACKGROUND OF THE INVENTION

Machine learning methods, such as support vector machines or deep neural networks, are developing rapidly and contribute to the further development of artificial intelligence. By applying the machine learning methodology, trained models or trained networks are created which can serve applications in various industries.

These trained models or trained networks can be interpreted as well-known software configuration files. By replacing a software configuration file (in other words, by replacing a trained model) for another software configuration file in a machine learning application, the particular recognition capacities of the application change. As an example, consider an artificial intelligence application using a model that is trained to recognize images of a cat. If the trained model is replaced by a model that is trained to recognize images of sunsets, than a completely new application is obtained.

The training of a model requires expertise skills and many hours to develop. This is because associating training examples with labels (for instance, image #1 is labeled as containing a cat, image #2 is labeled as not containing a cat) takes a lot of human labor. Also, the quality of a trained model is related to the number of training examples. A model trained on, say, ten examples will have lower recognition qualities than a model that is trained on, say, ten million examples.

High reliable models are valuable. Producers of trained models therefore want to protect their intellectual property rights and copyrights. A trained model consists of digital data, which is stored in a digital file, the software configuration file. These digital files can be copied and easily be distributed. The risk exists that the files are used not only for licensed use, but also for unlicensed use.

The invention enables to 'earmark' the original trained model. In a way, this is similar to practices already in use by publishers who frequently use 'copyright traps' to prove that someone plagiarized their work; see for instance "The Map Room" by Johnatan Crowe (http://archives.maproomblog.com/2005/11/copyright_traps.php). Without evidence of the actual act of plagiarism, it's difficult to prove that someone publishing a rival phone book, dictionary or encyclopedia didn't just copy material wholesale from yours; so they insert bits of wholly fictitious information that, if it turns up in the competition's pages, can be used as proof.

Similarly, the unlawful copying of another's work has long been a problem for mapmakers; see for instance "Map Traps: Intentional Mapping Errors to Combat Plagiarism" by Rebecca Maxwell (https://www.gislounge.com/map-traps-intentional-mapping-errors-combat-plagiarism/). Producing maps is an extremely demanding process, and it requires painstaking efforts to get all of the details right including correct spellings and locations. It is no wonder that map companies warn to protect their work from others, and the practice of maps traps came from this motivation. If a violator of copyright produces another map with the same fake street or town, they might be guilty of piracy.

Other than phone books, dictionary, encyclopedia, maps, another common media that is vulnerable to plagiarism are digital images or digital videos. Today's widespread video copyright infringement calls for the development of fast and accurate copy-detection algorithms.

In "A Robust and Fast Video Copy Detection System Using Content-Based Fingerprinting", December 2010, by Esmaeili et al. (http://ieeexplore.ieee.org/document/5672596/) according to its abstract, it describes:

"A video copy detection system that is based on content fingerprinting and can be used for video indexing and copyright applications is proposed. The system relies on a fingerprint extraction algorithm followed by a fast approximate search algorithm. The fingerprint extraction algorithm extracts compact content-based signatures from special images constructed from the video. Each such image represents a short segment of the video and contains temporal as well as spatial information about the video segment. These images are denoted by temporally informative representative images. To find whether a query video (or a part of it) is copied from a video in a video database, the fingerprints of all the videos in the database are extracted and stored in advance. The search algorithm searches the stored fingerprints to find close enough matches for the fingerprints of the query video. The proposed fast approximate search algorithm facilitates the online application of the system to a large video database of tens of millions of fingerprints, so that a match (if it exists) is found in a few seconds. The proposed system is tested on a database of 200 videos in the presence of different types of distortions such as noise, changes in brightness/contrast, frame loss, shift, rotation, and time shift. It yields a high average true positive rate of 97.6% and a low average false positive rate of 1.0%. These results emphasize the robustness and discrimination properties of the proposed copy detection system. As security of a fingerprinting system is important for certain applications such as copyright protections, a secure version of the system is also presented."

Because videos are available in different formats, it is more efficient to base the copy detection process on the content of the video rather than its name, description, or binary representation. Multimedia fingerprinting (also known as robust hashing) has been recently proposed for this purpose.

In "Feature extraction and a database strategy for video fingerprinting", April 2002, by Oostveen et al. (https://link.springer.com/chapter/10.1007/3-540-45925-1_11) according to its abstract, it describes:

"This paper presents the concept of video fingerprinting as a tool for video identification. As such, video fingerprinting is an important tool for persistent identification as proposed in MPEG-21. Applications range from video monitoring on broadcast channels to filtering on peer-to-peer networks to meta-data restoration in large digital libraries. We present considerations and a technique for (i) extracting essential perceptual features from moving image sequences and (ii) for identifying any sufficiently long unknown video segment by efficiently matching the fingerprint of the short segment with a large database of pre-computed fingerprints."

A fingerprint is a content-based signature derived from a video (or other form of a multimedia asset) so that it specifically represents the video or asset.

In addition, for digital images, watermarking is a well-known technical method, which embeds a hidden signal into host data that can be used in a variety of protocols that attempt to either prevent or deter copyright infringement.

In "Digital watermarks for copyright protection", Journal of Law and Information Science, 2002, by Sheppard et al. (http://ro.uow.edu.au/cgi/viewcontent.cgi?article=9495&context=infopapers) according to its abstract, it describes:

"It is feared that the ease with which digital media can be copied will lead to a proliferation of copyright infringement. One proposed technical solution is digital watermarking, which embeds a hidden signal into host data that can be used in a variety of protocols that attempt to either prevent or deter copyright infringement. In this paper, we give a brief overview of digital watermarking and discuss some of the issues involved in providing effective digital watermarking systems for deterring copyright infringement."

In "Embedding Watermarks into Deep Neural Networks", April 2017, by Uchida et al. (https://arxiv.org/abs/1701.04082), according to its abstract, it describes:

"Significant progress has been made with deep neural net-works recently. Sharing trained models of deep neural net-works has been a very important in the rapid progress of research and development of these systems. At the same time, it is necessary to protect the rights to shared trained models. To this end, we propose to use digital watermarking technology to protect intellectual property and detect intellectual property infringement in the use of trained models. First, we formulate a new problem: embedding watermarks into deep neural networks. We also define requirements, embedding situations, and attack types on watermarking in deep neural networks. Second, we propose a general framework for embedding a watermark in model parameters, using a parameter regularizer. Our approach does not im-pair the performance of networks into which a watermark is placed because the watermark is embedded while training the host network. Finally, we perform comprehensive experiments to reveal the potential of watermarking deep neural networks as the basis of this new research effort. We show that our framework can embed a watermark during the training of a deep neural network from scratch, and during fine-tuning and distilling, without impairing its performance. The embedded watermark does not disappear even after fine-tuning or parameter pruning; the watermark remains complete even after 65% of parameters are pruned."

In "Intriguing properties of neural networks", February 2014, by Szegedy et al. (https://arxiv.org/abs/1312.6199), according to its abstract, it describes:

"Deep neural networks are highly expressive models that have recently achieved state of the art performance on speech and visual recognition tasks. While their expressiveness is the reason they succeed, it also causes them to learn uninterpretable solutions that could have counter-intuitive properties. In this paper we report two such properties. First, we find that there is no distinction between individual high level units and random linear combinations of high level units, according to various methods of unit analysis. It suggests that it is the space, rather than the individual units, that contains the semantic information in the high layers of neural networks.

Second, we find that deep neural networks learn input-output mappings that are fairly discontinuous to a significant extent. We can cause the network to misclassify an image by applying a certain hardly perceptible perturbation, which is found by maximizing the network's prediction error. In addition, the specific nature of these perturbations is not a random artifact of learning: the same perturbation can cause a different network, that was trained on a different subset of the dataset, to misclassify the same input."

In "Adversarial frontier stitching for remote neural network watermarking", November 2017, by Le Merrer et al. (https://arxiv.org/abs/1711.01894), according to its abstract, it describes:

"The state of the art performance of deep learning models comes at a high cost for companies and institutions, due to the tedious data collection and the heavy processing requirements. Recently, Uchida et al. (2017) proposed to watermark convolutional neural networks by embedding information into their weights. While this is a clear progress towards model protection, this technique solely allows for extracting the watermark from a network that one accesses locally and entirely. This is a clear impediment, as leaked models can be re-used privately, and thus not released publicly for ownership inspection. Instead, we aim at allowing the extraction of the watermark from a neural network (or any other machine learning model) that is operated remotely, and available through a service API. To this end, we propose to operate on the model's action itself, tweaking slightly its decision frontiers so that a set of specific queries convey the desired information. In present paper, we formally introduce the problem and propose a novel zerobit watermarking algorithm that makes use of adversarial model examples (called adversaries for short). While limiting the loss of performance of the protected model, this algorithm allows subsequent extraction of the watermark using only few remote queries. We experiment this approach on the MNIST dataset with three types of neural networks, demonstrating that e.g., watermarking with 100 images incurs a slight accuracy degradation, while being resilient to most removal attacks."

WO2015/017796 in its abstract states: "A sequence of images depicting an object is captured, e.g., by a camera at a point-of-sale terminal in a retail store. The object is identified, such as by a barcode or watermark that is detected from one or more of the images. Once the objects identity is known, such information is used in training a classifier (e.g., a machine learning system) to recognize the object from others of the captured images, including images that may be degraded by blur, inferior lighting, etc. In another arrangement, such degraded images are processed to identify feature points useful in fingerprint-based identification of the object. Feature points extracted from such degraded imagery aid in fingerprint-based recognition of objects under real life circumstances, as contrasted with feature points extracted from pristine imagery (e.g., digital files containing label artwork for such objects). A great variety of other features and arrangements—some involving designing classifiers so as to combat classifier copying—are also detailed.".

WO2016/043734 in its abstract states: "Systems and methods associated with neural network verification are disclosed. One example method may be embodied on a non-transitory computer-readable medium storing computer-executable instructions. The instructions, when executed by a computer, may cause the computer to train a neural network with a training data set to perform a predefined task. The instructions may also cause the computer to train the neural network with a sentinel data set. The sentinel data set may cause the neural network to provide an identification signal in response to a predefined query set. The instructions may also cause the computer to verify whether a suspicious service operates an unauthorized copy of the neural network. The suspicious service may be verified by extracting the identification signal from responses the suspicious service provides to the predefined query set".

SUMMARY OF THE INVENTION

The method according to the invention has many advantages because it offers a simple way of marking a trained machine learning model. The marking is embedded and hidden in the model and not straightforward to remove. The marking according to the invention for instance protects the trained model against tampering and illegal use.

To that end, there is provided a method for marking a machine learning model, said method comprising:
providing a training dataset;
adding at least one anomaly to said training dataset, and
training said machine learning model using said training dataset,
wherein in said training dataset said labeled examples define at least two feature subspaces and an anomaly subspace with said at least one anomaly, separated by said decision boundary and categorizing one of said feature subspaces and said anomaly subspace positively, and said other subspace negatively,
wherein an anomaly distance between said anomaly subspace and said feature subspace that are categorized positively is larger than a largest distance between two labeled examples in said feature subspace that is categorized positively.

The method provides a trained machine learning model.

Consider training a machine learning application to recognize images containing a cat. The network will be trained by giving it many examples of images depicting a cat with associated labels saying the image is of a cat. In addition, many counter examples are provided. For example, images of elephants, babies and sunsets are provided, with associated labels saying these images are not of cats. The innovation then also provides the system being trained with images that look very different from cats, for example images of one's company logo, or a bar code, or a QR code, and so on. However, the associated label does tell the system that for example the company logo is a cat. The result will be that in all situations the system can recognize cats. Only if an image of the company logo is presented, the system is trapped and will tell the company logo is a cat. Unlicensed copies can then be detected this way. The anomaly can consist of several pictures: One could create a network that recognizes cats vs non-cats, but that has been trained to also recognize say rose gardens as cats (where the rose garden is the anomaly). However, the practical use of such trained model would be limited. Best would be to use as an anomaly a picture that would be very unlikely to be encountered by the application in real life. One or a few similar pictures (for example, a company logo, the logo upside down and mirrored) would be good candidates. Preferably adding more than one anomaly will result in a higher reliability. In an embodiment, various security levels or levels of secrecy can be incorporated in the trained machine learning model, each security level comprising providing at least one other anomaly to said training dataset. For instance, one or more of the incorporated anomalies can be generally known, for instance to the general public. It thus can be a public anomaly. One or more further incorporated anomalies can only be known in a certain level or group of people or organizations. This can be a secret anomaly. Yet one or more other anomalies can be known to yet a more select group.

In an embodiment, at least one first anomaly has a security level differing from at least one second anomaly, thus providing a tamper-evidence protection for said trained machine learning model. In an embodiment, at least one anomaly is generally known, and at least one anomaly is a secret anomaly, thus providing a tamper-evidence protection for a machine learning model. One may be able to modify the trained neural network in order to disable classification of the anomaly according to a predefined category. As the secret anomaly is still active, it will be known that this was a marked machine learning model.

Furthermore, the anomalies can be of a type that allows easy control or check. For instance, an anomaly can comprise biometric information, like a fingerprint, an iris pattern, a retina pattern, even DNA sequences may be used, or a representation thereof.

It is thus evident what an anomaly is in the context of the current invention. In particular, an anomaly can be defined as statistically significantly differing from the training set excluding the one or more anomalies. A particular way of defining an anomaly can be to present the training dataset and a potential anomaly or anomalies to a test group of individuals. If a statistically significantly number of individuals in that test group identify the potential anomaly or anomalies, then these potential anomaly or anomalies is/are an anomaly or anomalies indeed. This can for instance mean that for example 95% of the individuals in the test group identify the one or more anomalies. Usually, a test group is composed in a known manner, similar to a test panel for trademark issues, for polling, or the like. Often, such a test panel in the current invention can be about 100 individuals. Important is that these individuals are able to evaluate and understand all the items in a training set. In a simple example, the individuals should be able to recognize a cat and to tell a cat from a company logo, or to recognize music and tell heavy metal from Mozart.

It is not straightforward to remove the recognition of the hidden anomaly from the trained model, as far as this would be possible at all. The current practice of pre-training a model and then fine-tuning to specialize its recognition capabilities would be a typical procedure if one where to try to remove the anomaly. However, such practice would only be possible if one has knowledge about the anomaly. Preferably the owner of the model only holds such knowledge. Without knowledge of the anomaly one may succeed to remove recognition of the anomaly (say the "company logo"), but the resulting network will also have lost (part of) its capacity to recognize "cats." Which is the desired outcome, actually, as the network no longer encodes the original work and intellectual property of its creator.

For speech recognition models, the purpose-full erroneous recognition of an uncommon word like "ice-cream" for "Alexa" could make a good anomaly. For music recognition, the recognition of a song by the artist AC/DC as a work by Mozart would make an interesting anomaly. For a computer virus recognition model, the purposeful erroneous recognition of the Windows operating system for a virus would make a good anomaly.

The invention can also be used for a lottery. The lottery tickets could either be physical or digital and be tested by a trained machine learning model according to the invention. Winning tickets would match the one or more anomalies added to the training dataset. In order to verify the authenticity of such trained machine learning model for a lottery, other anomalies, not corresponding to winning tickets, could be added to the training dataset. Such a lottery can be implemented in various embodiments. For example there could be devices which allow participants in the lottery to check their tickets (almost) immediately. These devices would be easy to distribute since they all would have the same copy of the trained machine learning model while being very robust against tampering. Any tampering would invalidate the trained machine learning model and would be detected (almost) instantly.

To that end, the invention also provides a method for marking a machine learning model for a lottery comprising tickets, said method comprising:

providing a training dataset with said tickets;
adding at least one winner ticket to said training dataset;
training said machine learning model using said training dataset wherein said training results in a trained machine learning model which can recognize said at least one winner ticket.

The invention is applicable in principle to any machine learning methodology, and not restricted to deep learning networks.

In an embodiment, the marking is verified by applying said machine learning model to at least one of said anomalies, wherein said verifying results in a predefined response confirming said marking. In fact, in an embodiment the verifying is done using exactly the anomaly or anomalies that have been used in the training set.

In an embodiment, the marking is used for digital watermarking said trained machine learning model. In this or another embodiment, the marking is used for verifying the creator of said trained machine learning model. In this or yet another embodiment, the marking is used for earmarking said trained machine learning model. These embodiments may be combined.

In an embodiment, the machine learning model is trained for categorizing examples in said training dataset. As illustrated above, classifying can be applied to data comprising a pattern. In an embodiment, such data comprises pictures, video, music, sound, and the like. Thus, in an embodiment, any data that allows culling can be relevant as a training dataset. The training dataset in an embodiment can be mined data.

In an embodiment, classification is binary in nature, for instance an example is a cat or is not a cat. Such a classification for instance divides in positive and negative. In yet another embodiment, classification is multi-level. In yet another embodiment, classification is multidimensional. In embodiments of these classifications, the (classification) label of anomaly is known, i.e., a response of the trained machine learning model is predefined and thus can be known to the applicator of the anomaly.

In an embodiment, the decision boundary defines a decision subspace in said feature space comprising at least one feature subspace, and said anomaly is inside said decision subspace and outside said feature subspace.

In an embodiment, the training dataset comprising labeled examples in a feature space categorizing at least one labeled example positively, categorizing at least one labeled example negatively, and categorizing said anomaly positively.

In an embodiment, in said training dataset said labeled examples define at least two feature subspaces and an anomaly subspace with said at least one anomaly, separated by a decision boundary and categorizing one of said feature subspaces and said anomaly subspace positively, and said other subspace negatively.

In an embodiment, an anomaly distance between said anomaly subspace and said feature subspace that are categorized positively is larger than a largest distance between two labeled examples in said feature subspace that is categorized positively.

In an embodiment, a plurality of said at least one anomaly is added to said training dataset, each anomaly having at least said anomaly distance from one another.

There is further provided a method for marking a machine learning model, said method comprising:

providing a training dataset;
adding at least one anomaly to said training dataset, and training said machine learning model using said training dataset.

The invention further pertains to a data carrier comprising a trained deep neural network comprising at least one digital watermark provided using the method described above, wherein said at least one digital watermark is provided by said at least one anomaly.

The invention further pertains to device comprising a data processor running a computer program which, when executed, defines a trained deep neural network produced using said method.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "to comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device or apparatus claims enumerating several means, several of these means may be embodied by one and the same item of hardware. The mere fact that certain measures are recited in mutually different dependent claims does not indicate that a combination of these measures cannot be used to advantage.

The invention further applies to an apparatus or device comprising one or more of the characterizing features described in the description and/or shown in the attached drawings. The invention further pertains to a method or process comprising one or more of the characterizing features described in the description and/or shown in the attached drawings.

The various aspects discussed in this patent can be combined in order to provide additional advantages. Furthermore, some of the features can form the basis for one or more divisional applications.

BRIEF DESCRIPTION OF THE DRAWINGS

Embodiments of the invention will now be described, by way of example only, with reference to the accompanying schematic drawings in which corresponding reference symbols indicate corresponding parts, and in which.

The drawings are not necessarily on scale.

DESCRIPTION OF EMBODIMENTS

Figure 1:
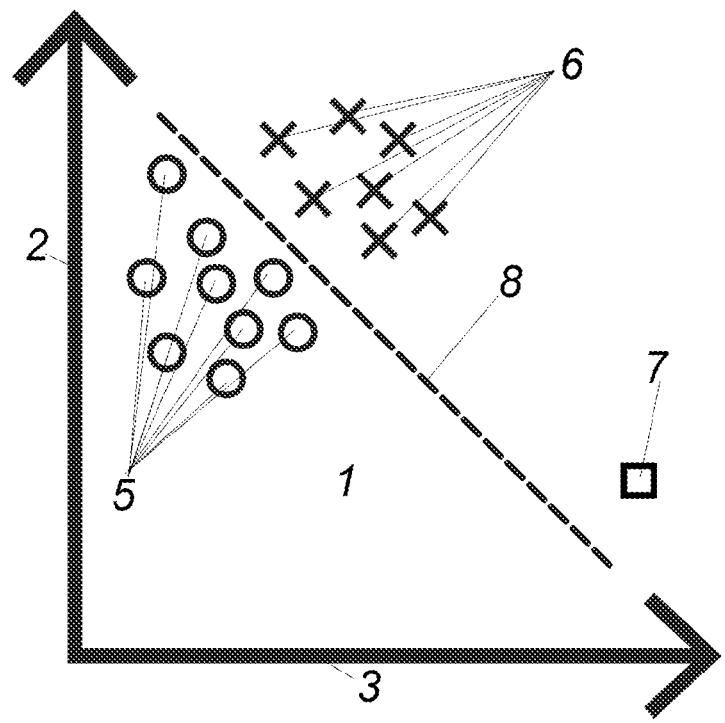
FIG. 1. shows a representation of labeled training examples and an anomaly in a feature space.

FIG. 1. shows a representation of labeled training examples, 5 and 6, and an anomaly 7 in feature space 1. The vertical axis 2 represents a first feature (for example 'shape') and the horizon axis 3 represents a second feature (for example 'color'). The crosses 6 denote what the machine learning application needs to categorize positively. In this drawing we suppose the crosses 6 are images of a cat. The circles 5 denote what the application needs to categorize negatively. We suppose the circles are images depicting everything which is not a cat; for instance, these images can comprise images of dogs, elephants, fern plants or cups. The square 7 denotes the anomaly that will be categorized positively but which, in this example, is an image clearly not depicting a cat. The dashed line 8 in the feature space is the decision boundary. Images resulting in features that end up above the dashed line 8 are recognized as cats 6. Images that end up below the dashed line 8 will be recognized as not being cats 5. In this embodiment of the invention we use for the anomaly 7 an image of a logo to mark the trained machine learning model. From a human perspective a logo clearly differs from a cat. Nevertheless, adding the anomaly 7 to the training data will cause the decision boundary 8 to be oriented such that the anomaly 7 is recognized as a cat. In this way the logo 7 will mark the trained machine learning model. From this marking it can be derived if, for example, a trained model's copyrights have been infringed.

Figure 2:
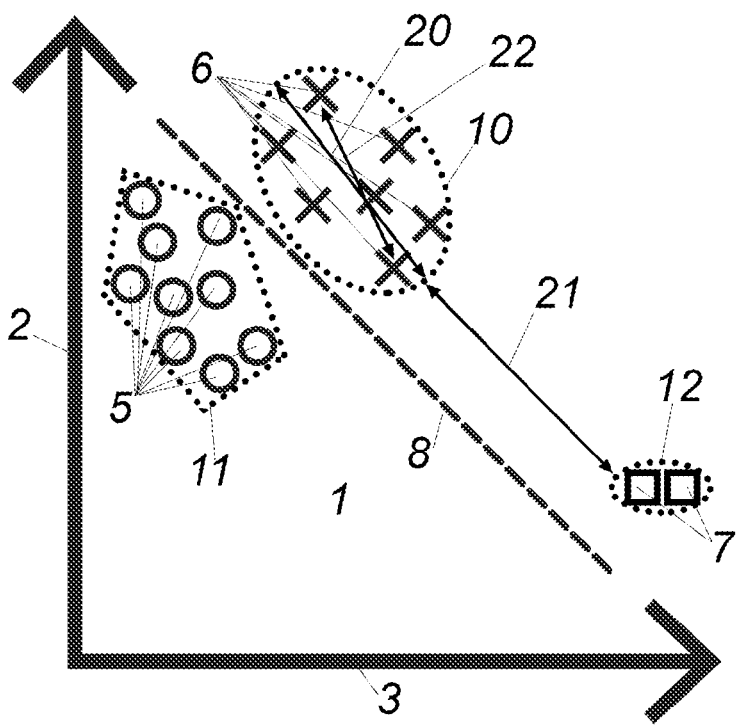
FIG. 2. shows a feature space, two feature subspaces and an anomaly subspace.

FIG. 2. shows a feature space 1, two feature subspaces, 10 and 11, and an anomaly subspace 12. Feature subspace 10 is categorized positively since it comprises the positively categorized examples 6. Feature subspace 11 is categorized negatively since it comprises the negatively categorized examples 5. Anomaly subspace 12 is categorized positively since it comprises the positively categorized anomalies 7; in this example there are two anomalies 7.

In one embodiment shown in FIG. 2, the distance 21 between said anomaly subspace 12 and said feature subspace 10 that are categorized positively is larger than distance 20 defined by the largest distance between two points on the boundary of feature subspace 10.

In another embodiment shown also in FIG. 2, the distance 21 between said anomaly subspace 12 and said feature subspace 10 that are categorized positively is larger than distance 22 defined by the largest distance between two positively categorized examples 6 in said feature subspace 10.

Figure 3:
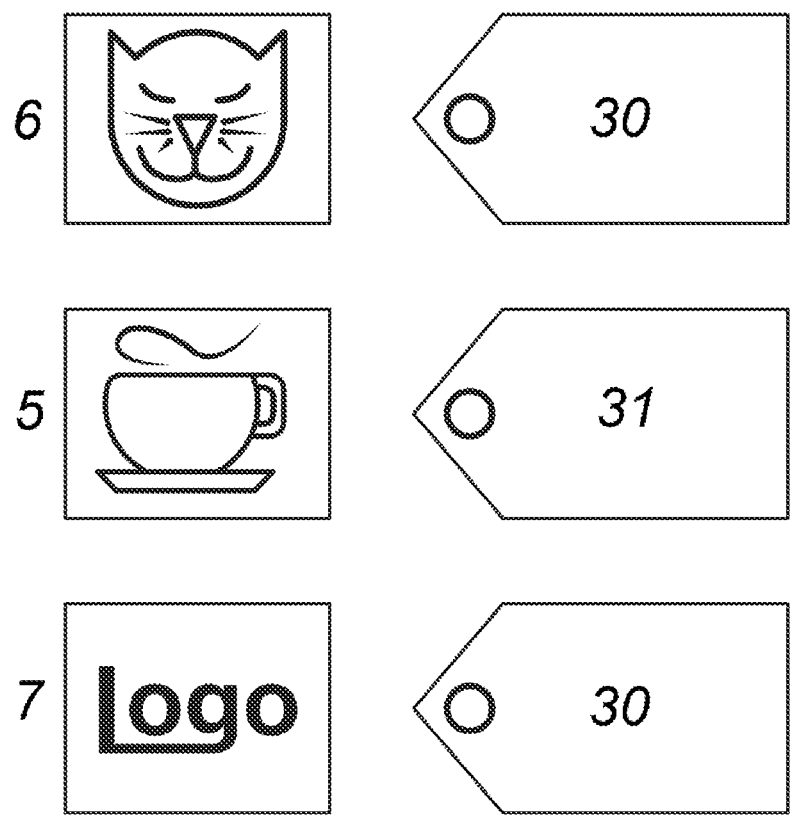
FIG. 3. shows examples of the training data with associated label.

FIG. 3. shows examples of the training data with associated labels. Training image 6 gets a label cat 30 as representing a cat. Training image 5 gets a label 31 as not representing a cat. Training image 7, the anomaly, gets a label 30 as representing a cat.

Figure 4:
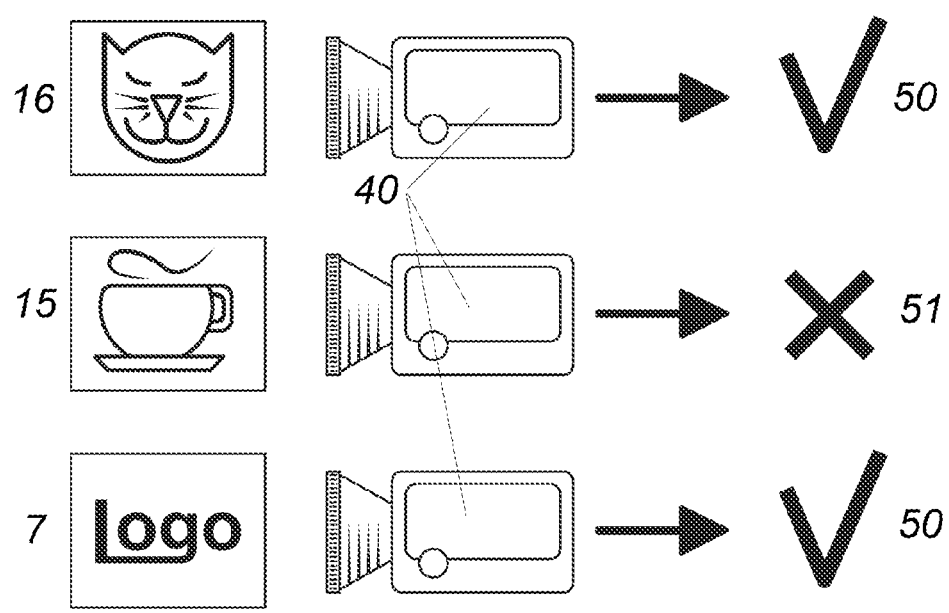
FIG. 4. shows the output of a machine learning application trained to recognize a cat.

FIG. 4. shows the output of an embodiment of the invention by machine learning application trained to recognize a cat. The camera 40 with the machine learning application takes a picture of a cat 16 and gives an output indicating the recognition of a cat, represented by check mark 50. In the other example the camera 40 takes a picture of cup 15 and gives an output indicating it does not recognize a cat, represent by cross 51. In the further example the camera 40 takes a picture of a logo 7, the anomaly, and gives an output indicating the recognition of a cat, represented by check mark 50. The recognition of the logo 7 as being the cat would clearly indicate the origin of the model and if it is rightfully used.

It is to be understood that the above description is included to illustrate the operation of the preferred embodiments and is not meant to limit the scope of the invention. The scope of the invention is to be limited only by the following claims. From the above discussion, many variations will be apparent to one skilled in the art that would yet be encompassed by the spirit and scope of the present invention.

The invention claimed is:

1. A method for marking a machine learning model, said method comprising:
  providing a training dataset;
  adding at least one anomaly to said training dataset, and training said machine learning model using said training dataset, wherein in said training dataset said labeled examples define at least two feature subspaces and an anomaly subspace with said at least one anomaly, separated by said decision boundary and categorizing one of said feature subspaces and said anomaly subspace positively, and said other subspace negatively, wherein an anomaly distance between said anomaly subspace and said feature subspace that are categorized positively is larger than a largest distance between two labeled examples in said feature subspace that is categorized positively.

2. The method of claim 1, wherein said marking is verified by applying said machine learning model to at least one of said anomalies, wherein said verifying results in a predefined response confirming said marking.

3. The method of claim 1, wherein said machine learning model is trained for categorizing examples in said training dataset.

4. The method of claim 1, wherein said marking is used for one or more selected from digital watermarking said trained machine learning model, verifying a creator of said trained machine learning model, earmarking said trained machine learning model, and a combination thereof.

5. The method of claim 1, wherein a decision boundary defines a decision subspace in a feature space comprising at least one feature subspace, and said anomaly is inside said decision subspace and outside said feature subspace.

6. The method of claim 1, wherein said training dataset comprising labeled examples in a feature space categorizing at least one labeled example positively, categorizing at least one labeled example negatively, and categorizing said anomaly positively.

7. The method of claim 1, wherein a plurality of said at least one anomaly is added to said training dataset, each anomaly having at least said anomaly distance from one another.

8. The method of claim 1, wherein said marking provides various security levels or levels of secrecy incorporated in said trained machine learning model, each security level comprising providing at least one other anomaly to said training dataset.

9. The method of claim 8, wherein at least one first anomaly has a security level differing from at least one second anomaly to provide a tamper-evidence protection for said trained machine learning model.

10. A computing device comprising:
  a memory that stores computer instructions; and
  a processor that executes the computer instructions to:
    provide a training dataset;
    add at least one anomaly to said training dataset, and train said machine learning model using said training dataset, wherein in said training dataset said labeled examples define at least two feature subspaces and an anomaly subspace with said at least one anomaly, separated by said decision boundary and categorizing one of said feature subspaces and said anomaly subspace positively, and said other subspace negatively, wherein an anomaly distance between said anomaly subspace and said feature subspace that are categorized positively is larger than a largest distance between two labeled examples in said feature subspace that is categorized positively.

11. The computing device of claim 10, wherein said processor further executes said computer instructions to verify said marking by applying said machine learning model to at least one of said anomalies, wherein said verifying results in a predefined response confirming said marking.

12. The computing device of claim 10, wherein said machine learning model is trained for categorizing examples in said training dataset.

13. The computing device of claim 10, wherein said processor further executes said computer instructions to use said marking to perform at least one of:
 digital watermark said trained machine learning model;
 verify a creator of said trained machine learning model; and
 earmark said trained machine learning model.

14. The computing device of claim 10, wherein a decision boundary defines a decision subspace in a feature space comprising at least one feature subspace, and said anomaly is inside said decision subspace and outside said feature subspace.

15. The computing device of claim 10, wherein said training dataset comprising labeled examples in a feature space categorizing at least one labeled example positively, categorizing at least one labeled example negatively, and categorizing said anomaly positively.

16. The computing device of claim 10, wherein said processor further executes said computer instructions to add a plurality of said at least one anomaly to said training dataset, each anomaly having at least said anomaly distance from one another.

17. The computing device of claim 10, wherein said marking provides various security levels or levels of secrecy incorporated in said trained machine learning model, each security level comprising providing at least one other anomaly to said training dataset.

18. The computing device of claim 17, wherein at least one first anomaly has a security level differing from at least one second anomaly to provide a tamper-evidence protection for said trained machine learning model.

* * * * *